June 11, 1929.     F. A. BENFORD     1,716,361
LENS
Original Filed Oct. 17, 1922   5 Sheets-Sheet 1

Inventor:
Frank A. Benford,
by *Alexander D. Lunt*
His Attorney.

June 11, 1929.  F. A. BENFORD  1,716,361
LENS
Original Filed Oct. 17, 1922  5 Sheets-Sheet 2

Inventor:
Frank A. Benford,
by
His Attorney.

June 11, 1929.   F. A. BENFORD   1,716,361
LENS
Original Filed Oct. 17, 1922   5 Sheets-Sheet 3

Inventor:
Frank A. Benford,
by *Alexander D. Lunt*
    His Attorney.

June 11, 1929.  F. A. BENFORD  1,716,361

LENS

Original Filed Oct. 17, 1922  5 Sheets-Sheet 4

Inventor:
Frank A. Benford,
by Alexander D. Lunt
His Attorney.

Inventor: Frank A. Benford, by his Attorney.

Patented June 11, 1929.

1,716,361

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

LENS.

Application filed October 17, 1922, Serial No. 595,185. Renewed July 2, 1928.

My invention relates to an optical system and to lenses for such system. More particularly the invention relates to an optical system and to lenses especially adapted for use in connection with motion picture apparatus, spot lights, and the like.

The specific problem in the design of optical systems and condensing lens for moving picture machines is to project the maximum amount of light through the aperture and film in an acceptable manner. The illumination of the screen may vary gradually so that the light at the corners may fall as low as 50 per cent below the light at the center and still not be objectionable; but if two adjacent areas, say six inches apart, are illuminated in the ratio of two to one, such differences would become marked and therefore objectionable. If the concentration of light at the aperture of the picture machine results in the formation of an image at or near the film, the projection lens projects this image on the screen which is attended with streaks of high and low brightness, color and other defects in illumination. Now the illumination of the screen is in its details but the duplication of the illumination of the film on a lower scale of intensity. The illumination at the film should therefore be free from images of the source of light which cause adjacent lights and shadows on the screen. The illumination at the film should also be free from chromatic aberration and in fact from any and all characteristics which when thrown on the screen become objectionable. In the design of a condensing lens for use in connection with a moving picture machine, we are therefore dealing with two opposing characteristics, namely, high projection efficiency, which means a tendency to produce images at the aperture and film, and smoothness and uniformity of screen illumination which means freedom from images at the aperture plate or film. Means should be provided for neutralizing and concelling at the aperture plate or film the effect of such image. The same is true if colors appear.

I have found in connection with lenses of the prior art which are used with the above apparatus, that some of them are so constructed that they give sharp images at the film and therefore uneven illumination with streaks, colors and the like on the screen. In an attempt to overcome these defects, lenses have sometimes been arranged to throw the image out of focus with respect to the aperture or film of the picture machine. Such adjustment, however, has resulted in considerable loss of light to the screen.

The Fresnel or prismatic type of condenser on the other hand resorts to the expedient of varying the image at the film by scattering the rays. But even with such type of lens a large percentage of the light is wasted—the efficiency of such lens varying from 50 to 66 per cent as compared with the optically perfect lens. Such a high percentage of loss of light is too great a sacrifice.

One of the objects of my invention is to provide an improved form of lens which avoids any of the above mentioned objectionable features of the prior art which features include uneven illumination, chromatic aberration and excessively high percentage of loss of light.

I have also found that lenses used for light projecting purposes which are subjected to the heat of the light source and particularly to the heat of the arc-light, are subjected to great strains which very often cause the cracking of the lens.

Another object of my invention is to split the lens and thus reduce the strains due to the high temperature in order that such split lens may be used with reasonable safety in connection with such high temperature devices.

It will be understood that if a number of images of the same object are brought to a focus at the aperture plate or film, the foregoing objections with regard to streaks and chromatic aberration will be ameliorated provided a number of such images are produced, all being of different sizes. For example, a lens may be made such that its central portion will produce an image of the size or approximately the size of the aperture and such that the outer rim of the lens will produce an image at or about the aperture much reduced in size. Such a lens may be constructed so that the intermediate zones may produce images varying in sizes each zone producing, for example, a smaller image than the zone immediately within.

It is an object of my invention to provide a lens which is so constructed that various zones produce images of various sizes at or about the aperture or film and thus tend to neutralize or overcome the undesirable effects of nonuniformity of illumination at the screen without the loss of an objectionably high large percentage of the light.

It is one of the fundamental principles of optics that the image formed by any small section of the lens or mirror has the same angular dimension and perspective as has the object when viewed from that section. Thus, if one section of the lens is to one side of the axis of a circular disc, the image of the disc, formed by that section will be not circular but elliptical. It is on account of this principle that there is a limit to the angular width of lens or mirror designed to project sharp images. When the angular view changes enough to appreciably change the size and shape of the object, then the elemental images from the various optical sections will no longer coincide and the total image becomes blurred. This blurring action is useful where an image is not desired. Due to this characteristic the image formed by the right hand side of the condenser as well as the image formed by the left hand side of the condenser is blurred laterally, whereas the image formed by the upper part of the condenser as well as the image formed by the lower side of the condenser is blurred in a vertical direction. However, near the central portion of the condenser there is no such blurring. In order to secure uniformity of illumination from this section of the condenser some other expedient must be resorted to. I find that this can be done by cutting the lens in half, removing a section of the lens along the cutting plane and drawing the two portions of the lens thus formed toward each other. The result is that the optical centers of the two sections are displaced with respect to the optical axis of the system.

One of the objects of my invention is to make use of the perspective blurring and to make use of the split lens arrangement with displaced optical centers to produce uniformity of illumination upon the screen notwithstanding the production of images at or about the aperture or film.

Another object of my invention is to provide other features of improvement tending to increase the efficiency and serviceability of a lens of the above character.

To accomplish the foregoing and other useful ends, I construct a lens in a manner and of the form hereinafter more fully set forth and claimed.

Referring to the accompanying drawings.

Figure 1:
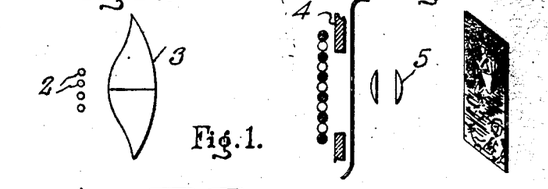
Fig. 1 is a plan view of the optical system, including the source of light, the lens and the aperture plate and an image at the aperture plate.
Figure 2:
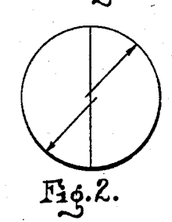
Fig. 2 is a view in elevation of the lens in Fig. 1.
Figure 3:
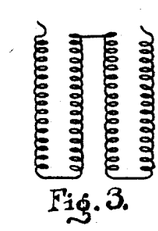
Fig. 3 is a view of the filament, Fig. 1, enlarged.
Figure 4:
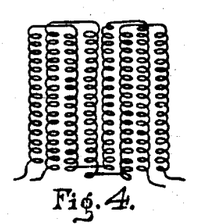
Fig. 4 is a similar view of the double image obtained with the lens enlarged from Fig. 1.

Referring more in detail to the accompanying drawings, and particularly to Fig. 1, it will be seen that the optical elements of a motion picture projector machine are the light source 2, a condensing lens 3 for collecting and projecting light through the aperture of the aperture plate 4 (behind which the film travels) to a projecting lens 5 which focuses the light on the screen. To this list may be added the usual sector disc (not shown) used to cut off the light when the film is being moved to the next section and the spherical mirror (not shown) that is commonly used behind the source of light. In this drawing I have represented the source of light as a four-coil filament incandescent lamp. A 900 watt lamp may be assumed. The coils of such a lamp are helical in form and about 0.08 inches in diameter, spaced on 0.11 inch center, leaving about 0.03 spaces between the coils. It is the space between the coils that causes the dark streaks on the screen and it is the coils themselves that cause the light streaks. The image of such a source of light makes an apparently simple problem in projection one of some difficulty.

The specific problem in the design of the condensing lens is to project the maximum amount of light through the aperture and through the film in an acceptable manner as heretofore stated. The concentration of light at the aperture as previously pointed out results in the formation of an image of the source of light, which, in this case is the filament, at or near the plane of the film and the projecting lens projects this image onto the screen giving the streaks and colors and other defects of illumination previously enumerated.

Figure 19:
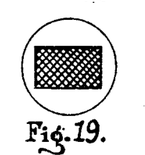
Figs. 19 through 26 show diagrammatically the image and objective as seen from the condenser by a pair of points as they move from the central toward the outer region of the condenser in opposite directions along a given diameter. In these figures the light source is considered located at the focus. The circles represent the objective lens and the ellipses represent the image formed on the focal plane.
Figure 20:
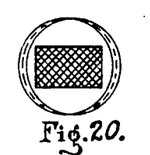
Figure 21:
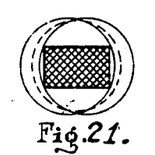
Figure 22:
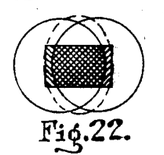
Figure 23:
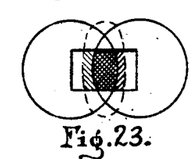
Figure 24:
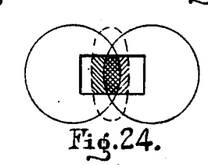
Figure 25:
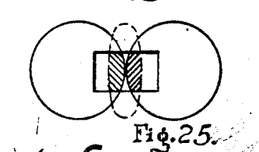
Figure 26:
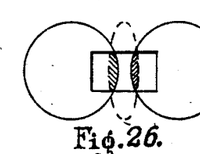

I have referred to the blurring effect due to perspective. I wish now to consider the conditions when a four-coil monoplane incandescent lamp is used such as I have indicated in Fig. 1 by exploring one small region of the condenser at a time as for example with a diaphragm with a series of apertures as indicated in Figs. 19 and 20. I have called attention to the fact that it is one of the fundamental principles of optics that the image formed by any small section of the lens has the same angular dimensions and perspective as has the object when viewed from that section. From a point in the center of the condenser there is very little distortion perceptible, if any, of the filament due to the angle of view. All four coils are seen separately so that the image will be composed of four fairly distinct coils with the individual turns in each coil visible and with the dark spaces between the coils of full width and darkness. This image from the center part of the lens is more distinct and well defined than from any other portion of the lens and it must be destroyed if uniformity of screen illumination is to be obtained. Let us now consider the images formed by the top and bottom sections of the condenser. From the top section the coils will appear foreshortened so that the top end of the filament will seem wider than the bottom but the spaces between the coils will all be visible in full proportional size. It will no longer be possible to see the interior of the helical coil through the space between the turns and to this extent the image will lose distinctness of detail. But the feature that causes unsatisfactory screen conditions, namely, the open spaces between the coils, will be as prominent as ever and it is evident that from all points of the vertical diameter of the condenser the images will be as distinct and objectionable as ever.

On the other hand, a point near the right or left edge of the condenser will give an entirely different image. Due to the angle of view from the right or left edges of the condenser the spaces between the coils will no longer be as wide as when viewed from the center and from the extreme edge they will entirely disappear. There are thus two sections: one on the right hand and the other on the left hand of a horizontal axis where satisfactory blurring of the image occurs, leaving, however, a broad but indefinite vertical band through the center of the condenser still forming sharp images.

Figure 27:
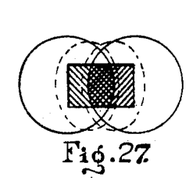
Figs. 27 through 29 are similar representations of the image and objective when the light source is displaced toward the condenser.
Figure 28:
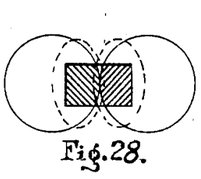
Figure 29:
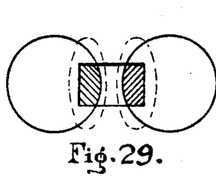
Figure 30:
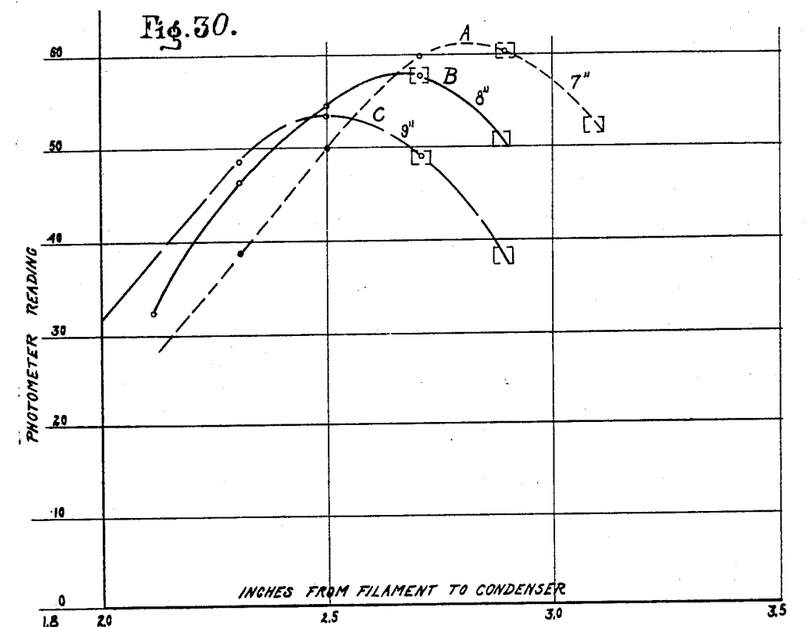
Fig. 30 shows the results of a photometric analysis of the amount of light reaching the screen when the condenser of my invention is located at 7, 8 and 9 inches from the aperture and when the lamp is moved to various focal points.
Figure 31:
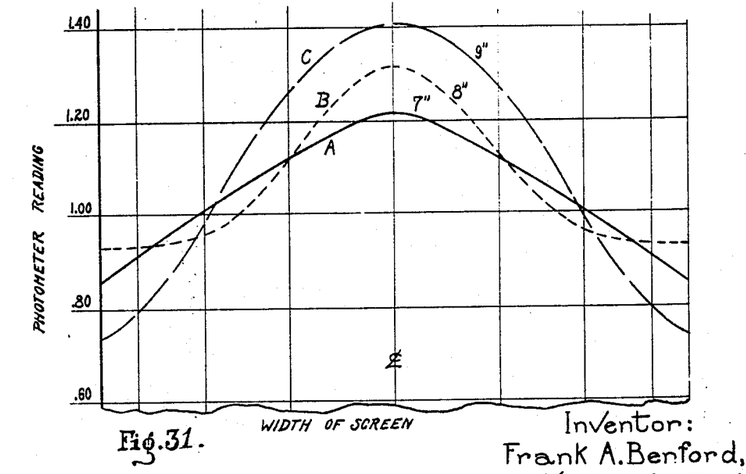
Fig. 31 shows the uniformity of illumination across the screen at the points of maximum illumination in Fig. 30.

The structure of lens which I propose therefore operates to destroy the image at the aperture from the vertical band without at the same time lowering the quantity of useful light that reaches the screen and in fact, I increase the quantity of useful light as will hereinafter more fully appear. As previously pointed out, the lens of my construction forms a series of images at the focal plane which latter pass through the aperture plate. Images naturally tend toward unsatisfactory illumination. However, as this lens forms a series of images, as already indicated, of various sizes, the feature in itself is a step in the right direction toward neutralizing the image effect. On the lens I make use also of the blurring effect due to perspective and which increases radially as the distance from the center increases. There is still one further feature to be considered which brings the effectiveness of this lens to a climax. This maximum effectiveness in distribution, however, is obtained after the condenser is designed for the maximum concentration of light upon the aperture by removing a central section of the lens along a plane passing through the axis of projection. The thickness of the section removed is equal to half the spacing of the filament coils used in the light source. The surfaces of the cut area are now polished and the two plane faces are placed together with the divided line in a vertical plane, or, in general, parallel to the direction of the filament coils. The optical axes of the two sections of the lens now no longer coincide but are separated and run parallel to each other and to the optical axis of the system at a distance of half the space of the filament coils. As a result, each part forms a separate and distinct set of images at the aperture plate and therefore upon the screen. Of necessity, these images now overlap by half a coil spacing so that the images of the coils produced by one half of the lens fall upon the dark spaces between the coils produced by the other half of the lens as may be discovered by means of the exploring diaphragm. In this manner the dark spaces are eliminated or reduced and there is a very marked improvement in the smoothness of the screen illumination without any sacrifice of light and the condenser can now be set in the position of maximum projecting efficiency and thus secure as close an approach to full theoretical efficiency as the limitation of the design and material will permit. Inasmuch as this correcting action diminishes away from the center of the lens, I make use of the blurring action previously mentioned, due to perspective, to supplement the effect due to the displacement of the optical axes of the two lens sections. The effective illumination of the right and left sections of the aperture by the respective sections of the lens does not compare with the effective illumination of the central section of the aperture due to geometrical limitations. I have explained how the blurring effect due to the perspective does not cover all the lens regions nor does it blur the image alike from all sides to give a sufficiently perfect illumination on the screen. I now will give a brief explanation as to how the shifting action due to the splitting of the lens likewise does not cover all regions of the lens so as to give a sufficiently perfect illumination on the screen without the assistance of the blurring effect. The corrective effect due to the splitting of the lens diminishes laterally away from the plane where the two split surfaces engage each other and reaches a minimum at the two extremities of the diameter of the lens at right angles to the said plane. This diminishing effect arises from the fact that the rays from the condenser from beyond the central region must converge toward the aperture to pass therethrough, coupled with the fact that the objective lens is some distance behind the film and coupled with the fact that the diameter of the objective lens is limited. As a result the rays from one side of the lens behave as though the objective were displaced toward one side of the aperture due to perspective while the rays from the other side of the lens behave as though the objective were displaced to the opposite side of the aperture. The farther from the center the ray, the greater the displacement until finally the aperture and the objective fail to overlap in perspective and as a result the images on the screen will begin to dissociate more and more due to failure to overlap. This condition is diagrammatically represented in Figs. 19 through 26 where the solid circles represent the objective lens as viewed, first from the center and then in perspective as the two points of view along the horizontal diameter are taken farther and farther from the center of the condenser lens. The ellipses represent the actual image section on the film, and the rectangles, the aperture. Figs. 27 through 29 represent the same situation when the source is displaced from the focal point toward the lens along the optical axis in which case two actual image sections must be represented by two ellipses.

In both sets of figures the shaded portions represent those portions of the film or of the images on the film which are actually reproduced on the screen.

Figures 17, 18:
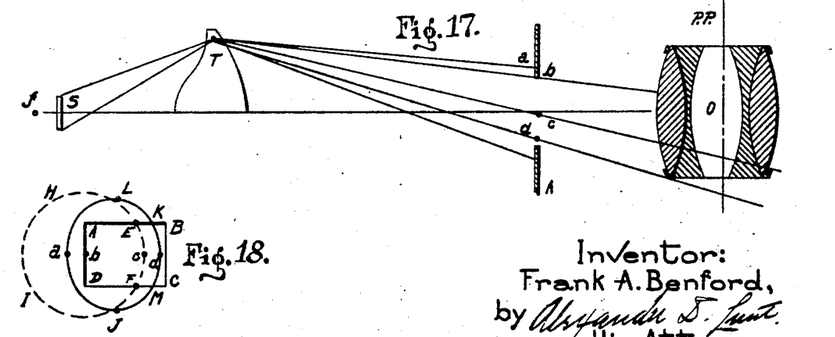
Fig. 17 is a plan view of the optical system showing rays collected by the edge of the condenser and intercepted by the aperture plate and showing rays which pass through and miss the objective. This figure also shows rays passing through both aperture and objective which rays of course reach the screen.
Fig. 18 is a view in elevation of the image thrown on the aperture plate and aperture, such image being represented by the solid ellipse. This figure also shows a view of the objective as seen from a point on the condenser in perspective. This perspective is represented by the dotted circle.

This subject may be considered from a different angle as follows, reference being had in particular to Figs. 15, 16, 17 and 18. It will be seen from Fig. 15 that rays within the angle $aTb$ strike the aperture plate and that rays within the angle $bTc$ pass through the aperture and objective; also rays within the angle $cTe$ strike the aperture plate. In order to simplify the explanation, I will consider the source of light as a disc instead of a filament lamp or arc-light. I will further assume that the source of light has been moved ahead of the focal point $f$ toward the collecting lens T. Under these conditions the image of the disc in the plane of the aperture is a circle $aMeo$, Fig. 16, moved slightly to one side due to the shifting of the axis of the part of the condenser under consideration; namely, the right hand section. The objective lens shown at the right, Fig. 15 can collect and project only such light originating at the point T as falls within the circle $jIIdJ$, Fig. 16. The effective light is that which passes through the aperture $aBcCDb$ which in this case is completely covered by both condenser beam and objective field. Referring now to Figs. 17 and 18, it will be seen that rays within angle $aTb$ strike the aperture plate; also rays within angle $bTc$ pass through aperture and objective lens and that rays within angle $cTd$ either strike inside of the objective lens or pass entirely outside. The image on the plane of the aperture in this case is ellipse $aLdJ$, Fig. 18, the minor axis of which is shown in projection as $ad$, Fig. 18. This is due to the fact that the rays of light are coming in from the outer region of the condenser. The light that passes through the aperture is contained within the boundaries $AEKdMFDb$. The objective lens can project only such light as falls within the limiting ellipse $HEcFI$ when originating at the point $T$ and hence effective light is confined within the area $AEcFDb$.

So far in the description of the physical relation and form of the images at the aperture, nothing has been said of the effects of the various colors that go to compose the light we are dealing with. Tests have shown that when dealing with the outer portions of the average condenser the images from this section are rich in color ordinarily. In the condenser of my design, the construction which produces images of various sizes at the aperture operates to neutralize the tendency in the outer zone to produce color. In fact, I have found that when the images are blurred by the double image plan and further blurred by the variable image construction, the colors disappear along with the intensity streaks. By the use of a lens of my construction, I am able to produce an illuminated screen free from undesirable or objectionable color and this without the aid of the usual spherical mirror behind the source of light. However, the use of the spherical mirror in connection with a lens of my construction tends also to destroy the color effect and less accuracy is required in the adjustment of the system.

I wish to call attention to the extreme width of the split condenser as compared with its focal length which is approximately of a speed 0.9. If I had used two spherical faces a lens of such speed would have been objectionable because of errors of direction, of focal length, of enlargement and chromatic errors of considerable magnitude due to spherical aberration. These undesirable features have been practically eliminated by the use of an aspherical first surface and a spherical second surface in the design of my lens. Furthermore, the light is directed with much greater accuracy in the desired direction than has been possible with lenses having two spherical faces. There is a point-by-point correspondence between the two faces so that whatever errors may inherently exist in the wide spherical face, are eliminated by the aspherical face and in those features of projection in which we are most interested, spherical aberration does not exist.

Attention has been called to the fact that along the outer zone, due to perspective, the wide angle of the condenser lens will give a blurred image. The result from the whole area of the lens is further improved by so designing the lens that each successive zone, as the circumference of the lens is approached, will give smaller and smaller images with the result that, first, there is a slight blurring of the total image due to the individual images not coinciding, and second, the reduced images from the outer edge of the condenser enables me to deliver more light to the screen than would be the case otherwise as will more fully appear from the following:

Not all of the light passing through the aperture falls upon the objective. Some light, particularly the light from the edges of the condenser, passes through at such an angle as to miss the objective lens. Obviously, these stray rays will heat the film without contributing light to the screen. This is illustrated in Fig. 17 where the ray $Tc$ is the last one to get to the screen and the light in the angle $cTd$ is wasted. Fig. 18 shows in a slightly different manner how neither the condenser nor the objective "cover" the entire aperture for light at a large angle with the axis. As a result of the limited area of aperture illuminated effectively by the edges of the condenser, there is some light that passes through the aperture that cannot be corrected by splitting of the lens. Thus, a great part of the effective light on the right hand end of the aperture comes from the right hand edge of the condenser and none from the extreme left. It is obvious that for these extreme rays a split is without effect.

I have found that perhaps only 25 per cent of the light from the outer section of the condenser strikes the objective and if the shape of the image could be controlled, an enlargement one-third of that of the image from the center would be sufficient but as we cannot control the shape of the image, when it is large enough in one direction to cover the effective area, it will be much too large in another.

Figures 15, 16:
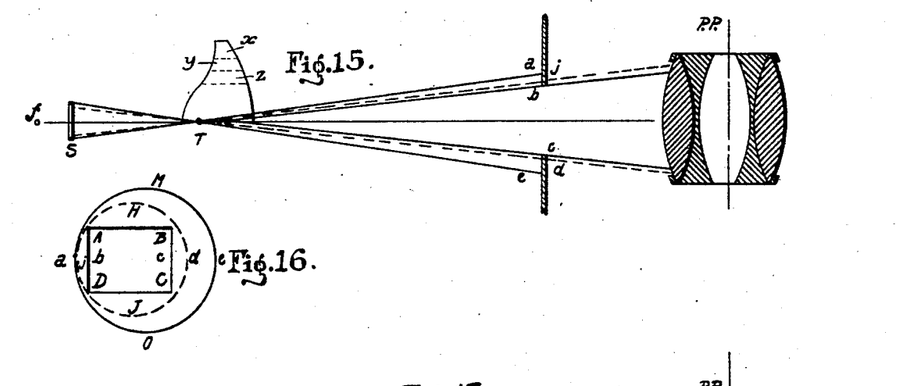
Fig. 15 is an elevation of the optical system showing certain rays from the center of the lens passing through the aperture and objective, the light source being a disc or circle.
Fig. 16 is a view in elevation of the image which image is represented by the solid circle and of the objective in perspective, the latter represented by the dotted circle. In the same figure the aperture is shown as a rectangle.

In Figs. 16 and 18 are shown by solid lines the images thrown on the aperture plate from the center and edge of the condenser and the dotted lines also indicate in each case the limit of the light collected by the objective. The light that falls within the boundaries of both curves is transmitted to the screen unless intercepted by the aperture plate. With the lamp placed in the focal point as designed, the center of the elliptical image $LKdMJa$, Fig. 18 will almost entirely coincide with the center of the aperture and the corners of the latter will not be covered. But as the objective does not collect light from corners B and C and as it does collect from the corners A and D, the image might profitably be moved over to cover these points as shown in Figs. 16 and 18 and in the latter sketch the image might be moved still further to the left so that point $d$ comes up to point $c$ without injurious effect. It has been found that by moving the lamp toward my lens the image is shifted as suggested above thereby increasing both efficiency and freedom from color and intensity streaks. The increase in efficiency is probably due to the fact that the center of the image is brighter than the edges on account of the two middle coils of the filament running hotter than the two outer coils and by bringing the central part of the image nearer in line with the center of the objective, the net transmission of light is increased. The colors due to dispersion are also more effectively washed out by moving the source of light out of focus, for the blue part of one image may be made to fall upon the yellow part of another and as a result, the colors on the screen will disperse.

I find that it is not necessary to keep the split accurately in a vertical plane. In fact, the split may be turned 30 degrees either way without noticeable loss of uniformity. If the split is placed in a horizontal position, the two sets of images are moved along lines parallel to the filament coils of the light source only reducing the gaps between the coils. If while the slit is horizontally disposed, we move one part of the condenser along in a horizontal direction across the optical axis, through half a coil space of the filament, an overlapping of the image results as before but the composition of the whole image is slightly different. Inasmuch as the edges of the condenser are useful only at the adjacent edge of the aperture, therefore, the upper and lower edges of the aperture are illuminated by a certain amount of light that forms an undestroyed image. This way of setting the lens will, with careful adjustment, and when used in combination with a reflector, give satisfactory results although there is not the same margin and freedom of adjustment that results when the slit is placed in a vertical position. Another method of relating the parts of the lens is to separate the parts so that their axes fall the proper distance apart in which case material would have to be added to the central portion of the lens instead of removed as heretofore described. With this construction the optical axis of each section of the lens would run parallel with the optical axes of the system on its own side of the major axis.

It is a matter of common knowledge that the condensing lens used in the ordinary motion picture projector is subject to breakage due to the heat strains set up by unequal heating and cooling. When the light source is an incandescent lamp, the danger of breakage is not as great as when an arc is used as a source of light, and particularly an arc of the gaseous or "high intensity" type. With the high intensity arc the percentage of breakage is quite large and a source of considerable expense. The strains in the condenser will be decreased if it is subdivided or made smaller or thinner. The split lens of my construction has been designed in sections rather than as a unit although it is probable that it can be more cheaply manufactured as a unit. When using two split condensers with an arc, the splits are in the best position to ease heat strains when in a vertical plane because the flame heats the top section of the condenser more than any other section and it is advisable to run the split through the hotter section. However, the split in the second condenser may be set as is best to satisfy optical requirements inasmuch as the second condenser is further from the heating source.

In designing a condenser it is a matter of great importance to have the turning angle of the first surface equal to that of the second surface or as nearly so as conditions will permit. We will now consider my lens from this standpoint.

Figure 13:
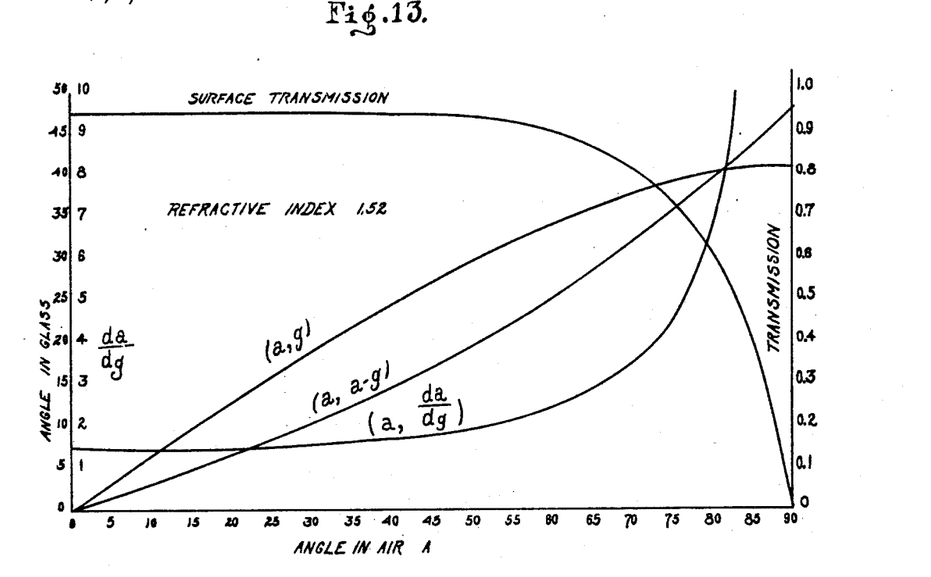
Fig. 13 is a drawing showing characteristic curves of surface transmission and of refraction of a glass lens with an index of 1.52.
Figure 14:
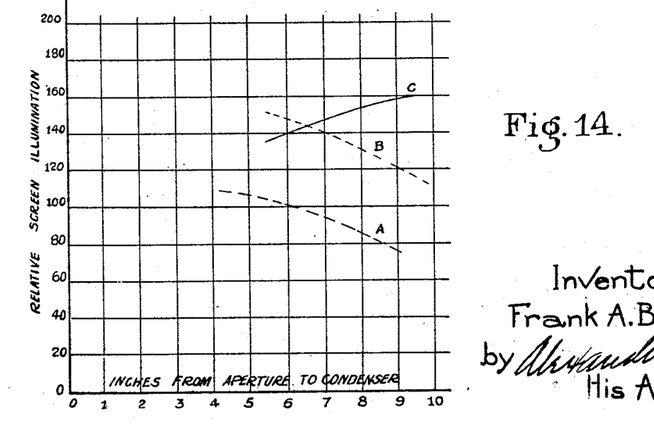
Fig. 14 is a drawing comparing a standard prismatic lens and the split lens of my invention for quantity of light delivered at the screen.

The surface transmission of glass having a refractive index of 1.52 is shown by the curves, Fig. 13. For all angles of incidence up to 50 degrees the transmission is 0.95 or more. At 60 degrees the transmission falls to 0.91, and at higher angles the drop in transmission is very rapid. The angular width of the condenser of my construction I have made about 80 degrees, which I consider the most satisfactory from a practical standpoint, taking into consideration optical properties, reliability and cost. Assume that it is desired to deviate the edge ray through an angle of 50 degrees. If 25 degrees deviation occurs at the first face and 25 degrees at the second face, the net transmission will be $0.91 \times 0.91 = 0.83$. If instead of equal deviations we select 20 degrees at the first face and 30 degrees at the second face, the net transmission will be $0.94 \times 0.85 = 0.80$ which is slightly less than in the previous case. It is therefore best, when other conditions allow, to have equal refractions at both faces as this assures a minimum surface loss.

A lens that turns light through an angle of 50 degrees must also have considerable dispersing effect; that is, there will be a dispersion of light into component colors. It is a principle of optics that this dispersion is near a minimum when the deviation at the two faces are equal. Therefore, we have two reasons for making the condenser symmetrical with the entering and emerging rays at the edge, viz: to reduce surface loss and to minimize dispersion. It will be understood that the outer zone of edge rays are selected because the conditions there are hardest to satisfy and if we are able to neutralize the spectra for the edge rays of the condenser, those from the more central region will be satisfactory. If other conditions call for unequal refractions at the two faces, it is important to know how much the dispersion of the red and violet rays is increased. The more the colors are spread out, the purer they will become and more difficult to neutralize. Let us refer then to the dispersion curves in the drawings:

For reasons of economy, it may often be advisable to have one face of the condenser cast and "fire polished" while the other face will be ground and polished in the usual way. The ground and polished face will of course have better accuracy than the cast face and it is important to decide which face should be ground and polished to secure the greatest accuracy and what will be the effect of surface errors in the cast face such as zones or wrinkles. The following shows how this is determined:

For the sake of simplicity of treatment, I will consider points on the extreme edge where the thickness of glass is small, and the distance between points on the two surfaces may be neglected in the computation.

Let $da$ = a small deviation of the ray in the air
$dg$ = a small deviation of the ray in the glass
$ds$ = a small deviation of direction of the glass surface.

Instead of giving the formulæ relating these three measurements to the angles involved and to the refracted index it is simpler to use the curve marked $\frac{da}{dg}$ on Fig. 13.

*Case I.*—Assume first surface in error by small angle $ds$. The ray in the glass is diverted through a corresponding small angle in the same direction.

$$dg = ds_1\left(1 - \frac{dg_1}{da_1}\right)$$

where $\frac{dg}{da}$ is the reciprocal of $\frac{da}{dg}$

The emergent ray is in error by $$da_1 = ds'\left(1 - \frac{dg_1}{da_1}\right)\frac{da_2}{dg_2}$$

*Case II.*—Assume second surface in error by small angle $ds$. The emergent ray is diverted through small angle $da'$ in the opposite direction.

$$da' = ds_2\left(1 - \frac{da_2}{dg_2}\right)$$

*Case III.*—Assume both surfaces in error by small angles $ds_1$ and $ds_2$ at the first and second surfaces respectively.

$$da' = ds_1\left(1 - \frac{dg_1}{da_1}\right)\frac{da_2}{dg_2} \pm ds_2\left(1 - \frac{da_2}{dg_2}\right)$$

As numerical examples, let us consider the surface errors to be one degree in each case, and see how the emergent ray is turned, for errors in the first surface, in the second surface, in both surfaces with opposed and conspiring directions. The data given below are for three condensers, one with faces making equal angles of deviation 25 deg. and 25 deg., one with faces making unequal angles of deviation 20 deg. and 30 deg. and another making unequal angles of deviation 30 deg. and 20 deg.

Errors of projection.

| Errors in surface | | Angle of deviation | | |
|---|---|---|---|---|
| First | Second | 25° and 25° | 20° and 30° | 30° and 20° |
| 1° | None | 1.50° | 1.55° | 1.10° |
| None | 1° | 1.50° | 2.10° | 1.00° |
| +1° | −1° | 3.00° | 3.65° | 2.40° |
| +1° | +1° | 0.0° | 0.55° | 0.40° |

A study of the errors tabulated shows that the deviation is least for the condenser having the greatest refraction at the first face and greatest for the condenser having the least refraction at the first face. If errors of projection were the only features to be considered, and if we could tolerate wide dispersion and strongly colored images, the ideal condenser would do all its refraction at the first surface, and the second surface would then be concave with the image point as a center.

The practical usefulness of the above table is this: It tells us that the greatest deviation should take place at the first surface if both surfaces are of equal accuracy. Or if for any reason the second surface must do most of the deviating, then its surface should be of higher accuracy, providing the method of construction indicates that one surface will be more accurate than the other. Thus, if one surface has a low grade fire polish and the other has a good optical polish, the optical polish should be on the second face.

There are at least three types of lens faces that are reasonably easy to grind and polish. These are the plane, spheroid and paraboloid. Any other form does not lend itself readily to grinding and polishing, and for projecting light with only a moderate degree of accuracy, one or two spherical surfaces which may be cast will often be satisfactory.

In the construction of my lens for reasons that will hereinafter appear, I have adopted a combination of an aspherical first face and a spherical second face. In the process of making a lens it is necessary at some stage to anneal the glass and during this heating the surface may be injured where it rests on the rack. If this surface is to be reground, it is best to have it plain or spherical or possibly parabolic.

If two aspherical faces are used, there is a wide choice of curves, and any one of the conditions for least surface reflection, least dispersion or some desired ratio of enlargement may be satisfied one at a time, but not all or even two at one time. The design must take care of all factors, giving each due weight, and must also consider the manufacturing limitations and costs.

Design data.

Figure 7:
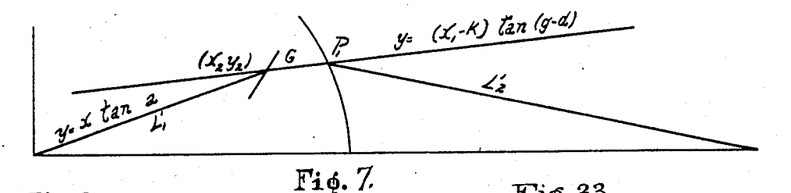
Fig. 7 is a diagrammatic illustration showing the second step in the process of arriving at the first surface of the lens.

In the construction of my lens I have adopted a distance of eight inches from the aperture to the second face of the condenser which fixes the dimension M of Fig. 7.

When the use of only one aspherical face is contemplated the simplest method of computing points on this face is to first select the other or regular face and then determine a number of rays that fulfill some given condition. For the design of the lens that is used the condition assumed was that of equal optical paths. The fulfillment of this condition causes all images to fall in a single plane, but the ratio of enlargement and other features must be controlled in some other way.

It was decided, for reasons already mentioned, to make the second surface spherical, and to do slightly more than half the deviating of the edge ray with this face. The design will thus be suitable for casting and polishing as already outlined, and as will be shown later the enlargement ratio varies in the proper direction.

The cone of rays converging on the aperture must be about 32 deg. in total width to cover the objective lens that it was proposed to use. This determines angle $f$, Fig. 5.

The width of the filament of the standard motion picture lamp is 0.45 in. and if the image is split and separated by a half coil spacing, the equivalent width becomes 0.50 in. The width of the aperture is 0.92 in. therefore an enlargement of two to one will be sufficient. This gives the ratio of $L_2$ to $L_1$, Fig. 5, but the crossing point of these two lines, the center of curvature and the location of the source remain to be determined.

Figure 5:
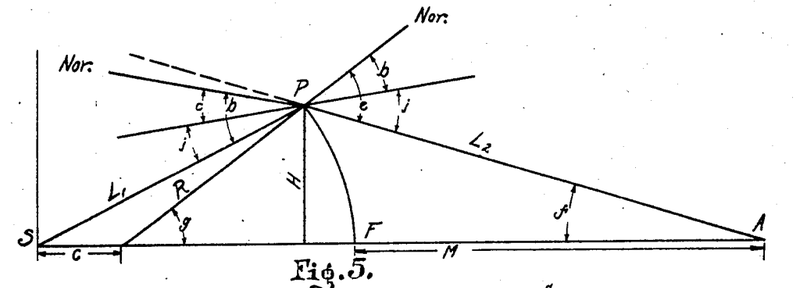
Fig. 5 is a diagrammatic illustration showing how the extreme edge of the lens is located and how the radius of curvature of the so-called second surface of the lens is located.

With $L_1$ and $L_2$ in a fixed proportion, the triangle SPA, Fig. 5 is fixed in shape, but the point F on the spherical front face must not be closer than 7 in. to the aperture at A, Fig. 5. To determine the curvature of PF we must first decide upon what refraction is to take place. The total deviation or angle between the direction of $L_1$ and $L_2$ is 50 deg. 42′, and this deviation was arbitrarily divided so that 23 deg. 12′ took place at the first face and 27 deg. 30′ at the second face.

With the deviation once fixed the angle of the spherical face at P can be determined, and the normal drawn to get the center of curvature at the point where it crosses the axis, giving the radius of curvature R.

This value of R may now be used to swing in the curve PF to see if the condition for the distance M is satisfied. The length of the extreme path $L_1 + L_2$ is a basic constant for the entire lens.

Fig. 5 and following equations show how the design is started with selected refraction at the edges of the first and second face, and with a selected cone of rays converging on the aperture. These equations lead to a determination of the radius of curvature of the spherical surface.

I will now refer to the following data which I have used in determining the second surface. Referring to Fig. 5:

$\frac{L_2}{L_1} = K$, a selected enlargement ratio (1)

$a + f =$ total deviation at point P (2)

$i =$ selected deviation at first face (3)

$j =$ selected deviation at second face (4)

$i + j = (b - c) + (e - d)$ (5)

$\sin e = n \sin (e - j)$ $\cot e = \dfrac{\cos j - \dfrac{i}{n}}{\sin j}$ (6)

$g = e - f$ (7)

$H = L_2 \sin f$ (8)

$R = \dfrac{H}{\sin g}$ (9)

$M = L_2 \cos f - R(1 - \cos g)$ (10)

Figure 6:
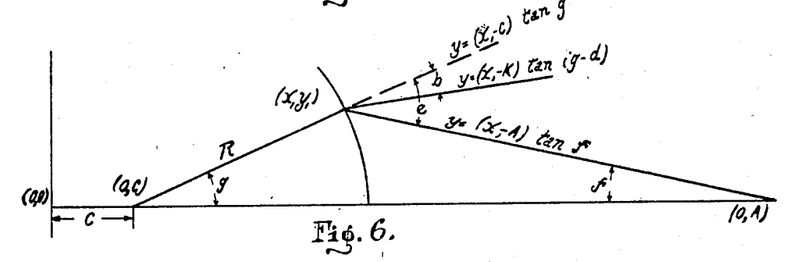
Fig. 6 is a diagrammatic illustration showing one of the steps in arriving at the first surface of the lens.

Referring to Fig. 6, I show in connection with the following how a ray is traced back from the aperture into the lens.

$y^2 = R^2 - (x_1 - c)^2$ (11)

$y = -(x_1 - A) \tan f$ at selected angle $f$ (12)

Solving for $x_1$.

$(1 + \tan^2 f) x_1^2 - 2(C + A \tan^2 f) x_1 + C^2 + A^2 \tan^2 f - R^2 = 0$ $x_1 = \dfrac{(C + A \tan^2 f) \pm \sqrt{(C + A \tan^2 f)^2 - (1 + \tan^2 f)(C^2 + A^2 \tan^2 f - R)}}{(1 + \tan^2 f)}$ (13)

$L_2 = \dfrac{A - x_1}{\cos f}$ (14)

$\cos g = \dfrac{x_1 - C}{R}$ (15)

$e = g + f$ (16)

$\sin d = \dfrac{\sin e}{n}$ (17)

Referring to Fig. 7 I show in connection with the following how the ray is traced back to the source giving a point $X_2 Y_2$ on the aspheric face.

$\begin{matrix} L_1 + nG + L'_2 = L_1 + L_2 \\ L'_1 + nG = L_1 + L_2 - L'_2 \end{matrix}$ (18)

Assume some angle $a$ $y_2 = x_2 \tan a$ $y_2 = (x_1 - k) \tan (g - d)$ $x_2 = \dfrac{k \tan (g - d)}{\tan a - \tan (g - d)}$ (19)

$L' = \dfrac{x_2}{\cos a}$ (20)

$G = \dfrac{x_1 - x_2}{\cos (g - d)}$

Substitute this value of G in (18) for trial solution.

Figure 8:
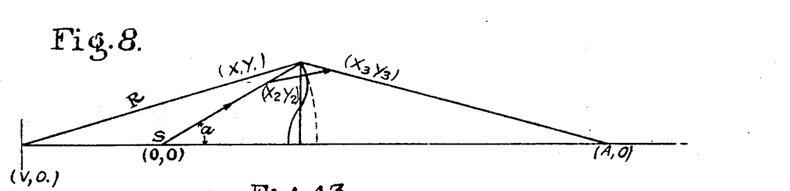
Fig. 8 is a drawing showing a locus of intercepts, or virtual crossing points within the lens of the entering and emerging rays produced, for unequal enlargements as represented by the solid line curve between the first and second surfaces and showing also the locus of intercepts for equal enlargements shown by the dotted curved line between the first and second surfaces.
Figure 9:
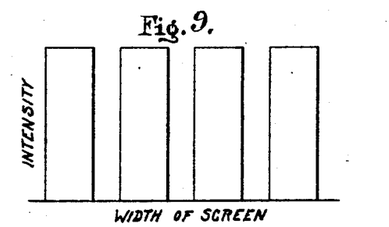
Fig. 9 is a diagrammatic illustration of the light intensity on the screen taken along a horizontal line when a four-coil filament lamp is used as a source of light when a non-split lens is used and when only a small central portion of the lens is uncovered at the exploring plate.
Figure 10:
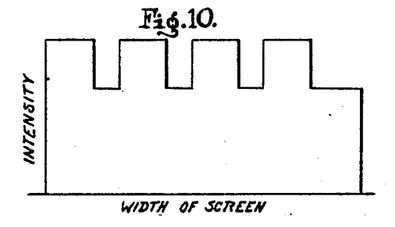
Fig. 10 is a similar illustration when a reflector is used behind the light source.
Figure 11:
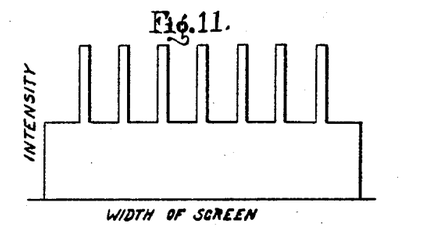
Fig. 11 is an illustration similar to that of Fig. 9 when the same lens is split.
Figure 12:
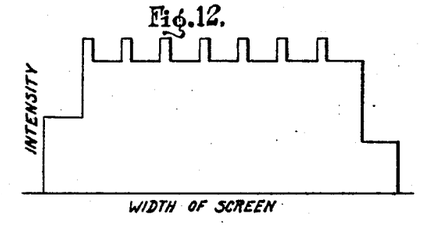
Fig. 12 is an illustration similar to that of Fig. 11 when a reflector is used behind the light source.

Referring to Fig. 8 I show in connection with the following how the enlarging ratio is determined and I give the particular case of uniform enlargement at all points of the lens.

Let E be the desired enlarging ratio between the size of the object at S and the image at (A, O). The incident and emitted rays are produced to intersect at some point $(x_1 y_1)$; then $$E^2(x_1^2 + y_1^2) = (A - x_1)^2 + y_1^2$$

or $$x_1^2 + y_1^2 + \frac{2Ax_1}{E^2 - 1} - \frac{A^2}{E^2 - 1} = O \quad (21)$$

which is the equation of a circle, and therefore the locus of the intersections of produced pairs of incident and emergent rays is a circle.

The radius of the circular locus is $$R = \frac{AE}{E^2 - 1} \quad (22)$$

and the center of the circular locus is at $$V = -\frac{2A}{E^2 - 1} \quad (23)$$

If the locus falls to the right of this circle as the angle $a$ is decreased then the center of the lens has a smaller enlarging ratio than at the point $(x_1 y_1)$ and conversely, if the locus fall to the left as the angle $a$ is decreased then the central enlargement is greater than at the edge $(x_1 y_1)$.

The last step in the design is to check the enlarging ratio at various points on the lens. If they do not come out satisfactorily, a new division of the refraction at the edge is made and the radius R is changed after which the whole computation is repeated.

So far the description has been confined to the single lens cut into only two lenticular segments and having the axis of each segment non-coincident. My invention contemplates also the provision of a lens having a plurality of lenticular segments. With such a construction my invention becomes especially adapted for use in connection with high intensity arcs such as are used for motion picture projection. As is well known, the central part of the high intensity crater is much brighter than the edges and some provision must be made to suitably distribute the light on the screen so as to avoid streaks due to the bright center. The natural method of procedure would be to throw the arc out of focus with respect to the aperture, thus blurring the image at the aperture and also at the screen. However, this results in a large percentage of the light being scattered and falling on the aperture plate itself. My invention contemplates avoiding such an inefficient arrangement. Therefore, I plan on cutting the lens up into a plurality of segments, four, for example. As a result we get four small but distinct images of the crater at the aperture so disposed that they will conform to the outline of the aperture as indicated in the accompanying Fig. 33. In the central portion of the aperture where the images overlap they mutually destroy definition. Inasmuch as the aperture is wider than it is high, I cause the displacement of the images sidewise to a greater extent between the top and bottom as indicated in the figure. I accomplish this by removing or adding different amounts of material from the vertical and horizontal cuts so as to enable the segments to be drawn closer together or separated further apart as heretofore described. If the displacement of the image is caused by the movement of the segments, the side-wise movement and the up and down movement will be unequal.

Figure 32:
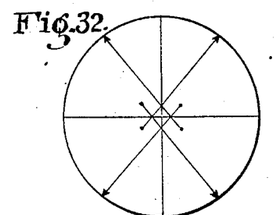
Figs. 32, 34 and 35 show modified forms of the lens.
Figures 33, 34:
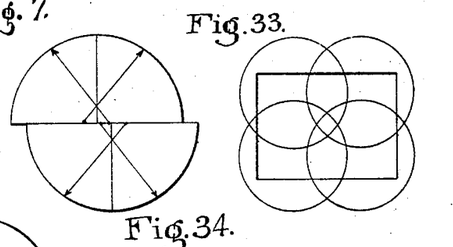
Fig. 33 shows how the images are distributed by the form of lens of Figs. 32, 34 and 35.
Figure 35:
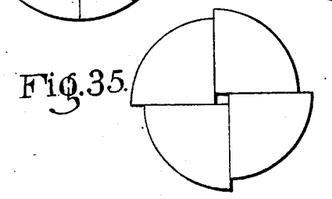

I also contemplate an arrangement which combines removing material from the cut to displace the segments in one direction and at the same time slipping the segments along the other cut as indicated in Fig. 34. As indicated in Fig. 35, the segments may be slipped in both directions. By any of these arrangements which I have indicated in Figs. 32, 34 and 35, the definition of the images at the screen would be avoided. Various concentric zones of the lens having a common focal plane are shown at $x, y, z$ in Fig. 15.

What I claim as new and desire to secure by Letters Patent of the United States, is:

1. A lens formed of lenticular segments of a solid of revolution generated about a given axis, the optical axis of each segment falling on the side of the axis of revolution opposite the corresponding segment, all of said axes extending parallel to the axis of revolution.

2. A lens formed of lenticular segments of a solid of revolution formed about a given axis, said segments being placed against each other to form a continuous unit, the optical axis of each segment falling on the side of the axis of revolution opposite the corresponding segment, all of said axes extending parallel to the axis of revolution.

3. A lens formed of lenticular segments from a solid of revolution generated about a given axis, each segment having a focal point, said points being non-coincident and located in a common focal plane, said segments being assembled together to form a unit, the optical axis of each segment falling on the side of the axis of the unit opposite the corresponding segment, all of said axes being parallel.

4. A lens formed of lenticular segments from a solid of revolution generated about a given axis, each segment having its individual optical axis outside the segment, said segments being assembled together to form a unit, the axes of the segments being parallel with the axis of revolution, the optical axis of each segment falling on the side of the axis of the unit opposite the corresponding segment.

5. A lens formed of lenticular segments of a solid of revolution generated about a given axis having an aspheric face and composed of lenticular segments, said segments being placed against each other to form a continuous unit, the axes of the segments being parallel, all of said axes extending parallel to the axis of revolution, the optical axis of each segment falling on the side of the axis of the unit opposite the corresponding segment.

6. A lens having a plurality of concentric zones all of the zones having a common focal plane, each zone having a corresponding focal region in the focal plane, which focal regions are non-coincident, said lens formed of a plurality of segments placed against each other to form a continuous unit, the optical axis of each segment falling on the side of the axis of the unit opposite the corresponding segment.

7. A lens having a plurality of concentric zones, all of the zones having a common focal plane, each zone having a corresponding focal region in the focal plane, which focal regions are non-coincident, said lens formed of a plurality of segments placed against each other to form a continuous unit, the optical axes of all of the segments being parallel, the optical axis of each segment falling on the side of the axis of the unit opposite the corresponding segment.

8. A lens formed of two segments of a complete figure of revolution about an axis, one segment being taken from one side of a plane away from said axis and the other segment being taken from one side of a plane away from said axis parallel to and to one side of the axis of projection of the figure said segments being held together along a given plane with their individual optical axis displaced with respect to the geometric axis of the lens as a whole, the axis of each segment being located on the side of the said geometric axis opposite to the segment whereby when interposed between a source of light and a screen, each section will produce separate but overlapping images of the light source upon the screen, all of said axes being parallel.

9. A lens constructed so that the ratio of the length of a path from the source of light to the locus of intercepts of any ray having a given angle of incidence with the optical axis to the length of the path of the same ray from the locus of intercepts to the focal plane is greater than the ratio of the similar sections of the path of any other ray whose incidence angle is less, said lens formed of a plurality of sections, the axis of each section being non-coincident with the optical axis of the lens and following on the side of the optical axis opposite to the side of the corresponding section.

10. A lens having a plurality of concentric lenticular zones, said lens being so formed that each zone has a separate focal region, all of said focal regions being located in a common focal plane, said focal regions being non-coincident, the surfaces of said lens being unbroken.

11. A lens consisting of more than two lenticular segments each consisting of a different part of a figure of revolution about a given axis, one segment being taken from one side of the plane through said figure and the other segment being taken from the other side of another plane through said figure, said planes being parallel to and to one side of the said axis, said segments being cemented together, the sum of the parts forming less than the complete figure of revolution, each lenticular segment having an independent optical axis, all of said axes being parallel.

In witness whereof, I have hereunto set my hand this 16th day of October, 1922.

FRANK A. BENFORD.